United States Patent [19]

Satoh et al.

[11] Patent Number: 5,065,061
[45] Date of Patent: Nov. 12, 1991

[54] EIEC TROMAGNETIC ACTUATOR FOR VALVE STEM

[75] Inventors: Ikumi Satoh; Jun Nakano; Riichiroh Harada; Tatsuhiko Koba, all of Iruma, Japan

[73] Assignee: Kabushiki Kaisha Yasakawa Denki Seisakusho, Kitakyushu, Japan

[21] Appl. No.: 481,046

[22] Filed: Feb. 16, 1990

[30] Foreign Application Priority Data

Feb. 17, 1989 [JP] Japan ................................ 1-18322U]
Dec. 20, 1989 [JP] Japan ................................ 1-147389[U]

[51] Int. Cl.5 .......................... H02K 1/14; H02K 5/16; H02K 5/128; H02K 37/04
[52] U.S. Cl. ...................................... 310/104; 310/54; 310/90
[58] Field of Search ................. 310/49 R, 86, 90, 104, 310/154, 54; 251/129.11

[56] References Cited

U.S. PATENT DOCUMENTS

| 3,733,504 | 5/1973 | Dennis | 310/86 |
| 3,916,231 | 10/1975 | Cathey | 310/90 |
| 4,184,090 | 1/1980 | Taiani et al. | 310/104 |
| 4,713,570 | 12/1987 | Mastromattei | 310/154 |
| 4,745,312 | 5/1988 | Nagasaka | 310/154 |
| 4,948,091 | 8/1990 | Satoh et al. | 251/129.11 |

FOREIGN PATENT DOCUMENTS

| 385203 | 9/1990 | European Pat. Off. | 251/129.11 |
| 1167431 | 4/1964 | Fed. Rep. of Germany | 310/86 |

Primary Examiner—Steven L. Stephan
Assistant Examiner—D. Rebsch
Attorney, Agent, or Firm—Beveridge, DeGrandi & Weilacher

[57] ABSTRACT

An electromagnetic actuator for a valve stem comprising a stator core having concentratedly wound coils around salient poles and the stator is positioned outside of a tubular member made of a nonmagnetic material. The electromagnetic actuator for a valve stem also has a rotor provided inside the tubular member for driving a threaded operating shaft such that it operats an objective member reciprocally an electromagnetic actuator for a valve stem is further constructed such that permanent magnets, alternately magnetized into a number of pole-pairs, are arranged along the surface of each salient pole of the stator core at a constant pitch, while a number of induction teeth are formed along the circumference of the rotor at a pitch equal to the pitch of the pole-pairs of the permanent magnets. The difference between the total number of the induction teeth and the total number of the polepairs of the permanent magnets is made equal to an even number. The rotor is rotated and the operating shaft is driven when an electromagnetic actuator for a valve stem operates as a pulse motor by alternating excitation of the coils.

23 Claims, 4 Drawing Sheets

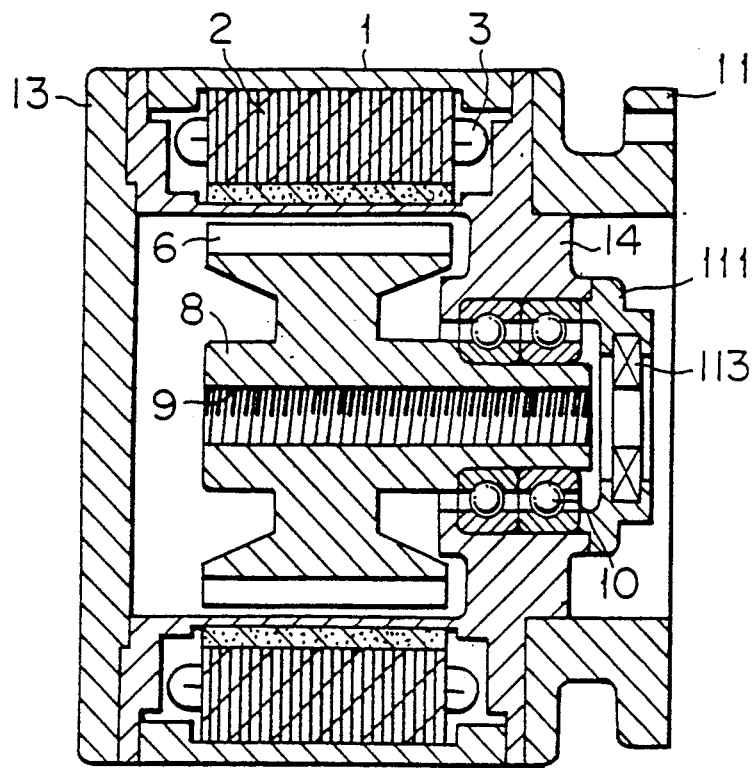
F I G. 8
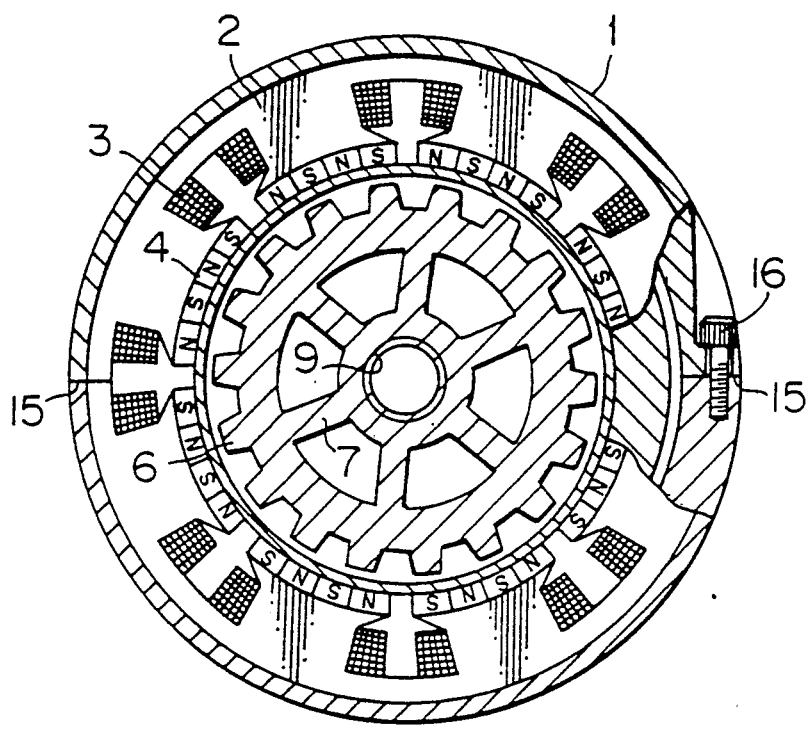
F I G. 9

EIECTROMAGNETIC ACTUATOR FOR VALVE STEM

BACKGROUND OF THE INVENTION

This invention relates to an electromagnetic actuator for a valve stem having a stator and a rotor separated from each other by a nonmagnetic tubular member, and adapted for driving an actuator such as a valve which is to be operated in the atmosphere of a high-temperature or corrosive fluid.

The known motor for actuating a valve is partially disclosed, for instance, in published U.S. Pat. Nos. 4,452,423 and 4,789,132 in which a stator producing a rotating magnetic field around the wall the tubular member is provided outside the tubular member, while a rotor rotatably supported by bearings is provided inside the tubular member at a position opposing the stator. The rotating movement of the rotor is converted into a linear movement of a valve member by a screw mechanism so as to control an opening and closing operation of the valve. The stator, in a type of the known motor for actuating a valve, is formed as a magnetic collar including a plurality of permanent magnets freely rotatable around the outside of the tubular member, while in another type it is constructed to include ordinary stator coils; the rotor in these types of devices is made of permanent magnets or a ferromagnetic member capable of producing eddy current (U.S. Pat. Nos. 4,452,423 and 4,789,132).

However, in a case where the stator is constructed in the form of a magnetic collar, a mechanism slidably rotating the magnetic collar around the outside of the tubular member is required. On the other hand, where the stator is constructed to include ordinary stator coils, the diameter of the stator becomes excessively large when the size of the coils is increased to increase the magnetomotive force. Furthermore, the number of magnetic poles is restricted by the shape and size of stator coils, so that the precision adjustment of the rotating angle is made difficult.

In addition, in a case where the rotor is made of permanent magnets, the operating property of the permanent magnets tends to be deteriorated by the high-temperature fluid, and the joining strength between the permanent magnets and a member supporting the same will also be reduced so as to increase the possibility of the permanent magnets being dropped out of the supporting member.

SUMMARY OF THE INVENTION

An object of the invention is to provide an electromagnetic actuator for a valve stem motor wherein the above described difficulties of the conventional constructions can be substantially eliminated while the electromagnetic actuator is positioned in-line with the fluid flow.

Another object of the invention is to provide an electromagnetic actuator for a valve stem which is economical in production and operable at a high precision and high reliability.

Still another object of the invention is to provide an electromagnetic actuator for a valve stem wherein the rotating members can be easily held in the stopped position, and furthermore the magnetic fluxes produced by the magnetic poles are superposed onto the magnetic fluxes produced by the permanent magnets, so that the efficiency of the magnetic field can be substantially improved.

These and other objects of the invention can be achieved by an electromagnetic actuator for a valve stem comprising a stator provided outside of a tubular member made of a nonmagnetic material, and a rotor rotatably supported by bearings within the tubular member opposing the stator, the rotor being rotated electromagnetically for driving an operating shaft such that it operates an objective member reciprocally, characterized in that the stator comprises a laminated iron core having a plurality of salient poles with a stator coil concentratedly wound around each salient pole, and a plurality of permanent magnets secured to an arcuate surface of each salient pole, the permanent magnets being alternately magnetized into a number of pole-pairs arranged along the surface at a constant pitch, multiple pole-pairs being configured onto the magnetic poles, whereas the rotor comprises an outer annular portion, an inner annular portion and a rim portion interconnecting the two portions, a number of induction teeth being formed along the circumference of the outer annular portion at a pitch equal to the pitch of the pole-pairs of the permanent magnets, such that the difference between the total number of the induction teeth and the total number of the pole-pairs of the permanent magnets is made equal to an even number.

The center of the inner annular portion of the rotor may be formed axially with a female screw thread which is engageable with a male screw thread formed on an operating shaft, so that the member to be operated by the electromagnetic actuator for a valve stem is driven by the operating shaft and converted into a reciprocating member.

In another embodiment, the operating shaft is fixedly secured to the inner annular portion of the rotor, and a male screw thread, which is engageable with a female screw thread formed in the member to be operated by the electromagnetic actuator for a valve stem, is formed along an end portion of the operating shaft.

Furthermore, the bearings rotatably supporting the rotor may be provided on both sides of the rotor or on one side of the rotor, such that the bearings are internally supported by the extension of the inner annular portion or held between the extension of the outer annular portion and the tubular member. In another embodiment where it is desired to prevent intrusion of a fluid inside the tubular member, a sealing mechanism may be provided on the output side of the electromagnetic actuator for a valve stem for sealing a gap formed around the operating shaft. In the other embodiments fluid flows through the tubular member such that an electromagnetic actuator for a valve stem can be used in-line with the fluid flow conduit.

BRIEF DESCRIPTION OF THE DRAWINGS

In the accompanying drawings:

FIG. 8 is a longitudinal sectional view showing a sixth embodiment of the invention; and FIG. 9 is a cross-sectional view similar to FIG. 2, showing a seventh embodiment of the invention.

DESCRIPTION OF THE PREFERRED EMBODIMENTS

Figure 1:
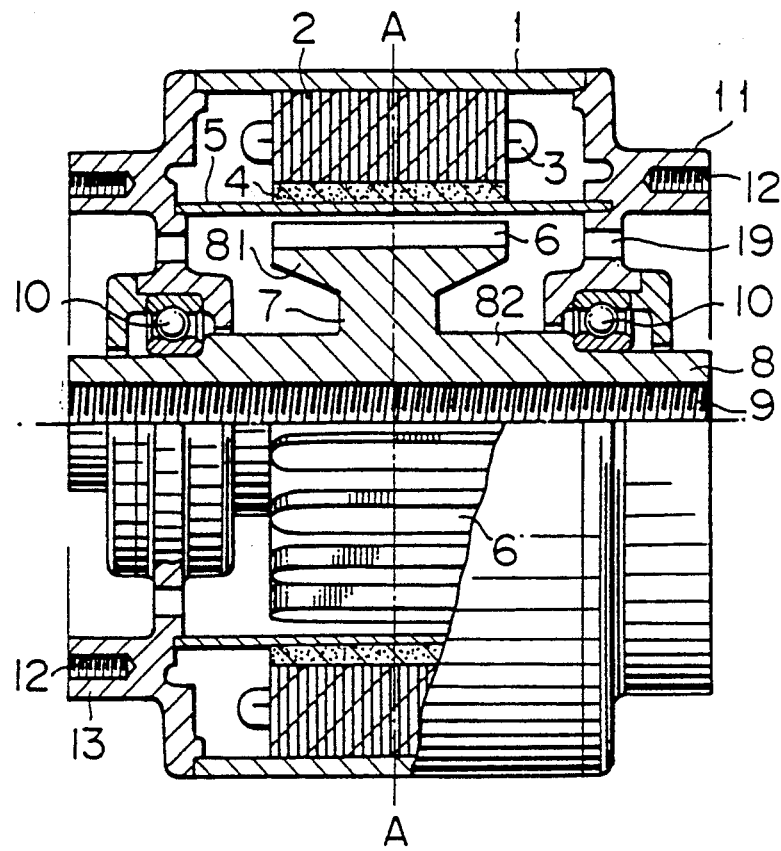
FIG. 1 is a profile view partly in section, showing a first embodiment of the invention.

This invention relates to an electromagnetic actuator for a valve stem wherein a permanent magnet type multiple synchronous motor disclosed in Japanese Patent Laid-Open No. 83565/1984, which was filed by the assignee of this invention, is applied to a motor adapted to drive an actuator in a reciprocating operation.

The invention will now be described in detail with reference to the accompanying drawings wherein similar members are designated by similar reference numerals.

Figure 2:
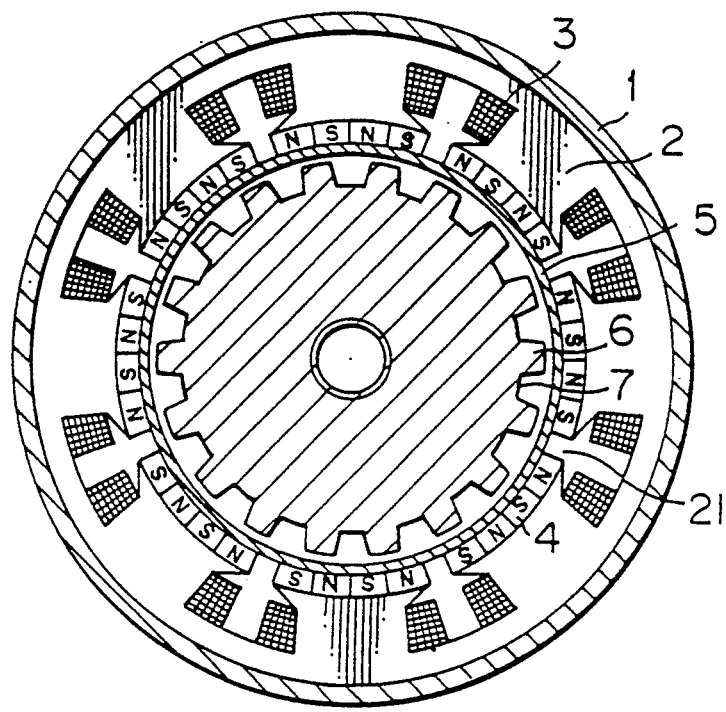
FIG. 2 is a cross-sectional view along the line A—A in FIG. 1.

FIGS. 1 and 2 illustrate a first embodiment of this invention. In this embodiment, a salient pole type magnetic core having an even number of salient poles 2 is encased in a supporting frame structure which includes cylindrical frame 1 and brackets 11 and 13, with polyphase stator coils 3 concentratedly wound around the salient poles 2, and thin permanent magnets 4 are secured radially to the inner surface of each salient pole, thereby forming a stator. The permanent magnets are magnetized alternately so as to form a number of pole pairs distributed along the surface of the salient pole at a constant pitch. Assuming that p represents the pitch of the pole-pairs of the permanent magnets and k represents a positive integer larger than 1, a gap 21 formed between two adjacent salient poles 2 of the stator core is expressed as $p \times (k - \frac{1}{2})$.

A nonmagnetic tubular member 5 made of stainless steel, plastic resin, or ceramics is provided to extend inside of the stator such that the tubular member 5 is tightly secured radially to the inner surfaces of the permanent magnets 4.

A rotor 8 having an outer annular portion 81 made of a ferromagnetic material is provided inside the tubular member 5 with an air gap maintained between the tubular member 5 and the rotor 8. A number of induction teeth are formed around the outer circumference of the annular portion 81 such that each of the teeth 6 extends axially and has a width equal to that of the permanent magnet 4 so as to provide fluid passageways between the teeth. When it is assumed that Nt represents the total number of induction teeth, Np represents the total number of pole-pairs of permanent magnets, and k represents a positive integer larger than 1, a relation of $|Np - Nt| = 2k$ is maintained between these numbers Np and Nt, so that the rotor and the stator are operated to constitute a pulse motor.

The rotor 8 further comprises an inner annular portion 82 with a female screw thread 9 formed in the center, and a rim portion 7 interconnecting the outer annular portion 81 to the inner annular portion 82. Brackets 11 and 13, each having a bearing housing, are provided on both sides of the rotor 8, and bearings 10 encased in the bearing housings are internally supported by both ends of the inner annular portion 82. Preferably brackets 11 and 13 are secured to both ends of frame 1 through notches formed therebetween. Each of the brackets 11 and 13 has a flange portion and means for coupling said electromagnetic actuator which can include bolt holes 12 and the like. A number of axial perforations 19 are formed radially through the brackets 11 and 13 at outward positions of the bearing housings.

The above described embodiment operates as follows.

When the polyphase stator coils 3 are excited successively, the magnetic field produced by the excited stator coils 3 is superposed on a bias magnetic field produced by the permanent magnets 4 in the air gap formed between the permanent magnets and the induction teeth 6, so that the resultant magnetic field is varied alternately in the direction of circumference depending on the pole-pairs of the permanent magnets. Thus varying magnetic field interacts with the induction teeth 6 for operating the motor as a hybrid pulse motor.

When the rotor 8 is rotated, an operating shaft (not shown) having a screw-threaded portion engaging with the female screw thread 9 formed in the center of the inner annular portion 82, but the rotation of the operating shaft is prohibited by linear guide means (not shown), so that an end effector is moved axially in a reciprocating manner.

Figure 3:
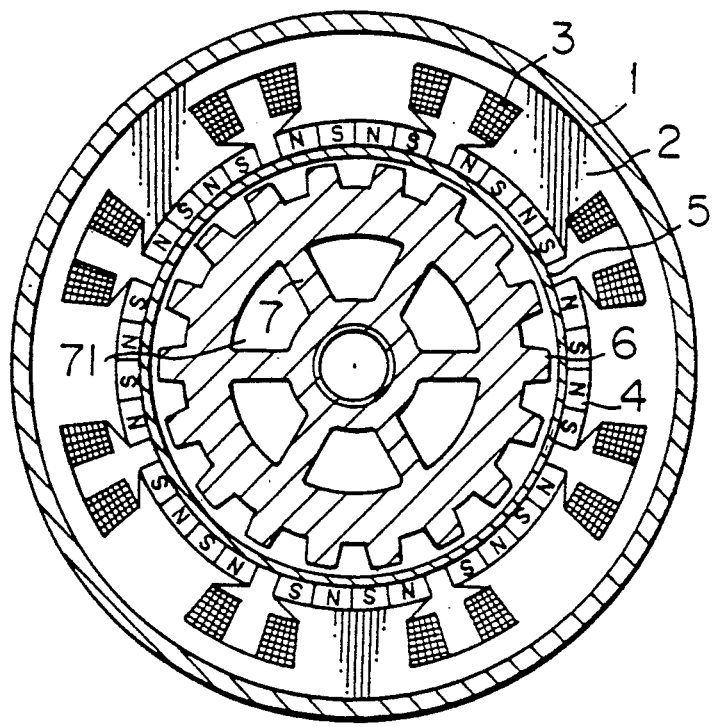
FIG. 3 is a cross-sectional view similar to FIG. 2 showing a second embodiment of the invention.

FIG. 3 illustrates a second embodiment wherein a plurality of perforations are provided axial through holes 71 through the rim portion 7 of the rotor 8 so as to reduce weight and to facilitate flow of the fluid.

Figure 4:
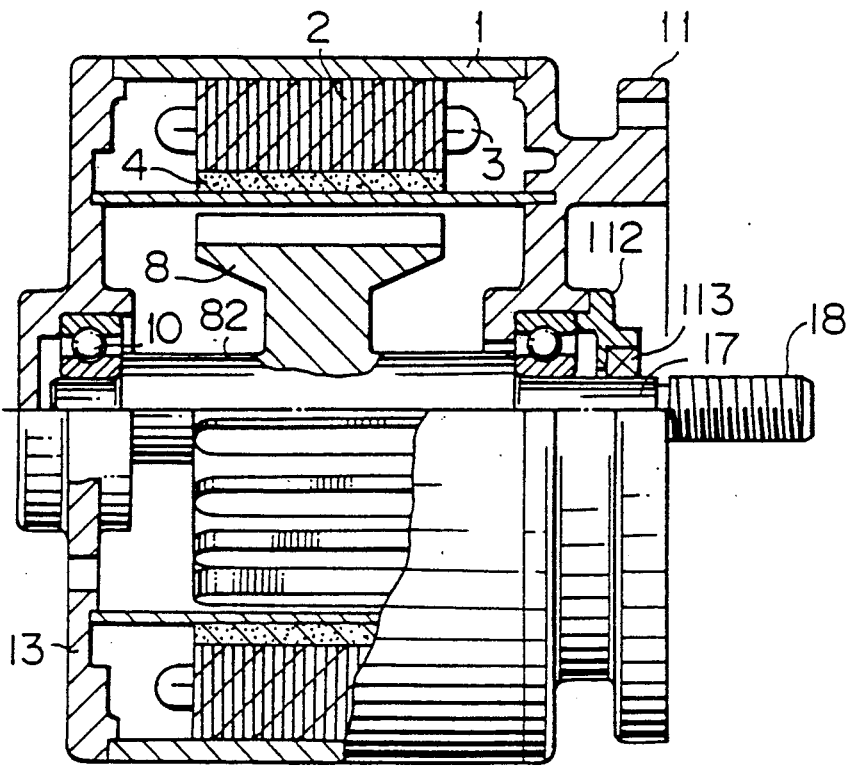
FIG. 4 is a view similar to FIG. 1 showing a third embodiment of the invention.
Figure 5:
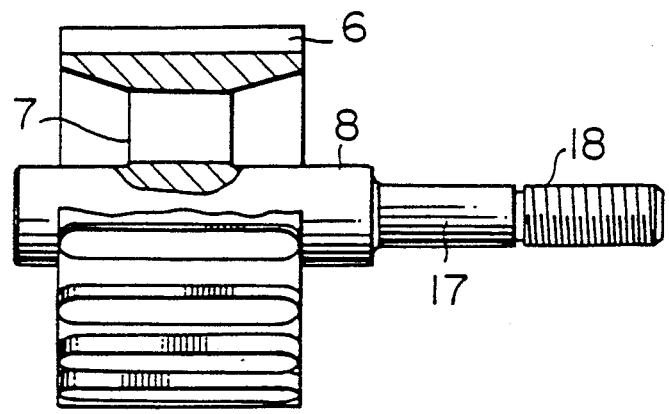
FIG. 5 is a profile view, partly in section, showing a rotor and related parts provided in the third embodiment.

FIGS. 4 and 5 illustrate a third embodiment of the invention wherein the inner annular portion 82 of the rotor 8 is formed solid, and a rod 17 is secured to an end of the portion 82 so as to extend axially. A screw thread 18 is formed at an end of the rod 17. When the rotor 8 is rotated, the male screw thread 18 rotates simultaneously. An operating shaft, which includes a female screw thread section, engages with screw thread 18 causing a reciprocating member (not shown) to reciprocate. The inner races of bearings 19 supporting rotor 8 are secured in both ends of rod 17 in a tight-fit manner, while the outer races of the bearings 10 are inserted in the same manner in the housing portions of the brackets 11 and 13. The axial end of the housing portion of bracket 11 is provided with a bearing cover 112 which is secured to the housing portion by means of a plurality of bolts. A mechanical seal and the like 113 is provided within the bearing cover 112 for sealing a gap formed around the rod 17.

Figure 6:
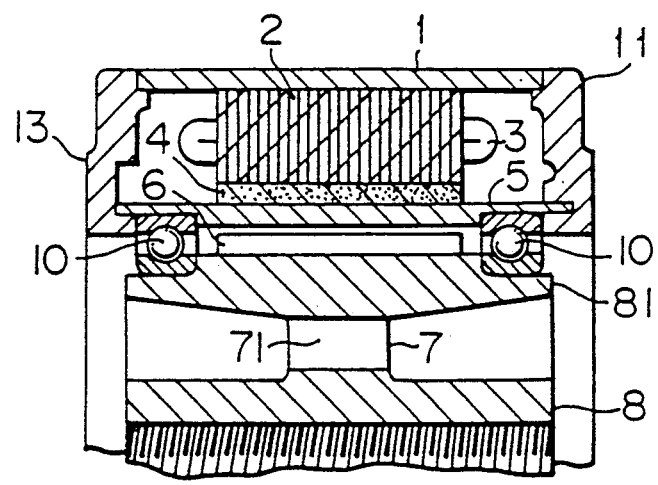
FIG. 6 is a longitudinal sectional view, showing one part of a fourth embodiment.

FIG. 6 illustrates a fourth embodiment. In this embodiment, the bearings 10 are supported between both extended parts of the outer annular portion 81 and the inner surface of the tubular member 5, so that the rotor 8 is thereby supported rotatably. In this embodiment, the bearing housings, provided integrally with the brackets 11 and 13, are omitted for simplifying the construction.

Figure 7:
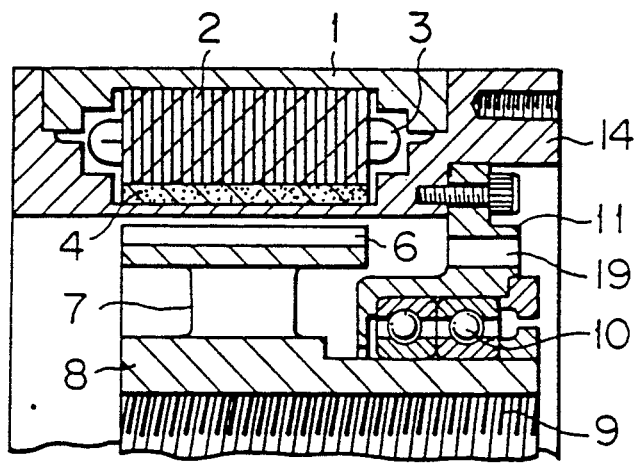
FIG. 7 is a view similar to FIG. 6 showing a fifth embodiment of the invention.

FIG. 7 illustrates a fifth embodiment. This embodiment includes a can frame 14 made of a nonmagnetic material and formed into a configuration wherein flange portions, similar to those provided integrally with the brackets 11 and 13, are formed as a part of the tubular member 5. The can frame 14 is further constructed such that an annular recess having an axial width slightly larger than that of the salient poles 2 is provided therein for accommodating the salient poles 2, and the bottom portion of the annular recess is made extremely thin so that frame 14 is operable as cylindrical can 5 of the first embodiment. The outer side of thinned portion of the can frame 14 is secured radially inside surface of the permanent magnets 4 provided in the stator. In this embodiment, bearings 10 rotatably supporting the rotor 8 are provided in a bracket 11 secured to the can frame 14 by means of a plurality of bolts, so that the rotor 8 is supported by the bearings in a cantilever manner.

FIG. 8 illustrates a sixth embodiment wherein bearings 10 encased in a housing secured in the can frame 14 support the rotor 8 in a cantilever manner.

Furthermore, a screw seal 113 is provided on the output side of the bearing housing which is constructed as in the case of the fifth embodiment, so that the output side of the embodiment is thereby entirely closed. It is useful for the male screw-thread operating shaft.

FIG. 9 illustrates a seventh embodiment wherein the frame 1 and the magnetic core of the stator are divided into two pieces along a plane 15. The divided two pieces of the magnetic core are settled in the recessed portion of the can frame 14, upper and lower halves of the frame 1 are assembled and engaged with each other as shown in FIG. 9 and clamped together by means of a plurality of bolts 16. By the above described construction, the maintenance on the condition of burnt coil can be facilitated.

According to the present invention, various advantages as described hereafter can be obtained.

(1) Since the operating shaft is shifted by a pulse motor of a direct driving type, the driving construction can be substantially simplified.

(2) Since the magnetic field of the permanent magnets is superposed on the magnetic field produced by the magnetic poles wound by the coils, the efficiency of the magnetic field and therefore the efficiency of the operation can be substantially improved.

(3) Since the motor is self-held simply by terminating the excitation, the end-effector can be easily maintained in the stopped position.

(4) Since the rotor is made of a ferromagnetic material hardly affected by high temperature, a high stability of the property and a rigid construction of the rotor can be realized.

(5) Since the operating shaft is driven by a pulse motor having fine strip-formed permanent magnets and induction teeth, a high precision positional control at a minute pitch angle is thereby made possible.

What is claimed is:

1. An electromagnetic actuator for a valve stem, comprising:
   a tubular member formed of a nonmagnetic material;
   a stator provided outside of said tubular member;
   bearings;
   a bracket positioned adjacent an axial end of said stator, said bracket including a bearing housing supporting said bearings;
   a rotor rotatably supported by said bearings within said tubular member and positioned in opposing relationship to said stator; and
   said rotor being rotated electromagnetically for driving an operating shaft such that it operates an objective member reciprocally, wherein, said stator further comprises a laminated iron core having a plurality of salient poles with a stator coil concentratedly wound around each salient pole, and a plurality of permanent magnets secured to an arcuate surface of each salient pole, said permanent magnets being alternately magnetized into a number of pole-pairs arranged along said arcuate surface at a constant pitch, whereas said rotor further comprises an outer annular portion, an inner annular portion and a rim portion interconnecting said two portions a number of induction teeth being formed along the circumference of said outer annular portion at a pitch equal to the pitch of said pole-pairs of the permanent magnets, such that the difference between the total number of the induction teeth and the total number of the pole-pairs of the permanent magnets is equal to an even number, and said bracket being formed with a plurality of axial perforations such that fluid passing through said electromagnetic actuator is free to flow through said perforations.

2. The electromagnetic actuator for a valve stem according to claim 1, wherein a plurality of through holes are formed axially through said rim portion of said rotor.

3. The electromagnetic actuator for a valve stem according to claim 2, wherein a female screw thread is formed in the center of said inner annular portion of said rotor.

4. The electromagnetic actuator for a valve stem according to claim 2, wherein said inner annular portion of said rotor is a solid member, and a rod extends away from said inner annular portion axially, and a male screw thread is formed on an end portion of the rod operable as an operating shaft.

5. The electromagnetic actuator for a valve stem according to claim 1, wherein said inner annular portion of said rotor is a solid member, and a rod extends away from said inner annular portion axially, and a male screw thread is formed on an end portion of the rod operable as an operating shaft.

6. The electromagnetic actuator for a valve stem according to claim 2, wherein said bearings supporting said rotor are secured at both ends of said inner annular portion of said rotor.

7. The electromagnetic actuator for a valve stem according to claim 3, wherein said bearings supporting said rotor are secured at both ends of said inner annular portion of said rotor.

8. The electromagnetic actuator for a valve stem according to claim 4, wherein said bearings supporting said rotor are secured at both ends of said inner annular portion of said rotor.

9. The electromagnetic actuator for a valve stem according to claim 2, wherein said bearings supporting said rotor are arranged in a cantilever manner.

10. The electromagnetic actuator for a valve stem according to claim 3, wherein said bearings supporting said rotor are arranged in a cantilever manner.

11. The electromagnetic actuator for a valve stem according to claim 4, wherein said bearings supporting said rotor are arranged in a cantilever manner.

12. The electromagnetic actuator for a valve stem according to claim 6, further comprising a bearing cover having a sealing mechanism arranged internally, said bearing cover is provided on a side of said bearings remote from said rotor.

13. The electromagnetic actuator for a valve stem according to claim 9, further comprising a bearing cover having a sealing mechanism arranged internally, said bearing cover is provided on a side of said bearings remote from said rotor.

14. The electromagnetic actuator for a valve stem according to claim 2, wherein said bearings supporting said rotor are provided between the internal surface of said tubular member and extended parts of said outer periphery of said rotor.

15. The electromagnetic actuator for a valve stem according to claim 3, wherein said bearings supporting said rotor are provided between the internal surface of said tubular member and extended parts of said outer periphery of said rotor.

16. The electromagnetic actuator for a valve stem according to claim 4, wherein said bearings supporting said rotor are provided between the internal surface of said tubular member and extended parts of said outer periphery of said rotor.

17. The electromagnetic actuator for a valve stem according to claim 1, wherein said stator is made separable into two pieces.

18. The electromagnetic actuator for a valve stem according to claim 1, wherein a female screw thread is formed in the center of said inner annular portion of said rotor.

19. The electromagnetic actuator for a valve stem, comprising:
   a supporting frame structure;
   a tubular member formed of a non-magnetic material and supported by said supporting frame structure;
   a stator provided outside of said tubular member, said stator having a plurality of salient poles and a stator coil wound around each salient pole;
   a plurality of permanent magnets secured to an arcuate surface of each salient pole, said permanent magnets being alternately magnetized into a number of pole-pairs arranged along said arcuate surface at a constant pitch;
   a rotor rotatably supported within said tubular member so as to be in opposing relationship with said stator, said rotor comprising an outer annular portion, an inner annular portion, and a rim portion interconnecting said inner and outer annular portions, said rotor further comprising a number of induction teeth formed along the circumference of said outer annular portion, and said supporting frame structure being positioned in line with a fluid conduit such that fluid passing through said supporting frame structure contacts said induction teeth as the fluid passes between and over said induction teeth.

20. The electromagnetic actuator for a valve stem according to claim 19, wherein said rim portion includes a plurality of holes through which fluid passes.

21. The electromagnetic actuator for a valve stem according to claim 19, wherein said supporting frame structure includes a cylindrical frame and brackets extending inwardly from the ends of said cylindrical frame and said brackets including a plurality of axial perforations formed therein through which fluid flows.

22. The electromagnetic actuator for a valve stem according to claim 19, wherein said induction teeth are formed along the circumference of said outer annular portion at a pitch equal to the pitch of said pole-pairs of permanent magnets, such that the difference between the total number of induction teeth and the total number of said pole-pairs is equal to an even number.

23. The electromagnetic actuator for a valve stem, comprising:
   a supporting frame structure;
   a tubular member formed of a non-magnetic material and supported by said supporting frame structure;
   a stator provided outside of said tubular member, said stator having a plurality of salient poles and a stator coil wound around each salient pole;
   a plurality of permanent magnets secured to an arcuate surface of each salient pole, said permanent magnets being alternately magnetized into a number of pole-pairs arranged along said arcuate surface at a constant pitch;
   a rotor rotatably supported within said tubular member so as to be in opposing relationship with said stator, said rotor comprising an outer annular portion, an inner annular portion, and a rim portion interconnecting said inner and outer annular portions, said rotor further comprising a number of induction teeth formed along the circumference of said outer annular portion, and said rim portion having a plurality of axially orientated through-holes formed therein; and
   said supporting frame structure including a bearing housing with bearings retained therein and said bearings are provided between the internal surface of said tubular member and extended parts of the outer annular portion of said rotor.

* * * * *